No. 868,471. PATENTED OCT. 15, 1907.
W. A. OUBRIDGE.
CHUCK.
APPLICATION FILED DEC. 28, 1906.

Witnesses.
Lloyd Blackmore
W. Cuff-Quin

Inventor.
W. A. Oubridge
by E. J. Fetherstonhaugh Atty

UNITED STATES PATENT OFFICE.

WILLIAM ARTHUR OUBRIDGE, OF COVENTRY, ENGLAND.

CHUCK.

No. 868,471.　　　Specification of Letters Patent.　　　Patented Oct. 15, 1907.

Application filed December 26, 1906. Serial No. 349,557.

*To all whom it may concern:*

Be it known that I, WILLIAM ARTHUR OUBRIDGE, a subject of the King of Great Britain, residing at 25 Gosford Green, Coventry, in the county of Warwick, England, have invented certain new and useful Improvements in Chucks, of which the following is a specification.

The invention relates to improvements in chucks, as described in the present specification and illustrated by the accompanying drawings that form part of the same.

The invention consists essentially of a socket member, a plurality of clutch members journaled within said socket member and a rotatable member governing the movement of said clutch members.

The objects of the invention are to provide a chuck of durable and simple construction capable of receiving drill shanks of different sizes and grip the same firmly to a central position and to facilitate the ready exchange of drills by the workman.

Figure 1:
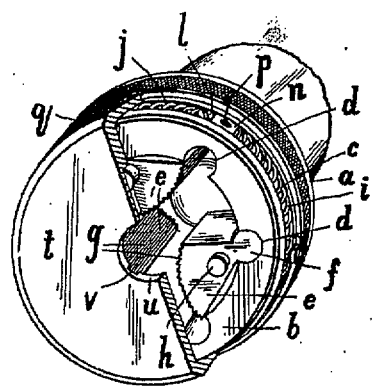
Figure 2:
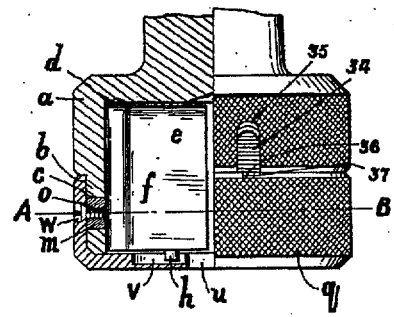
Figure 3:
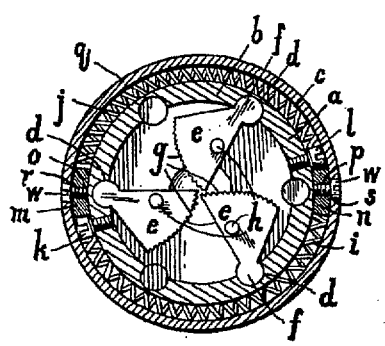

In the drawings, Figure 1 is a perspective view of the chuck having the face plate in section and showing a portion of the interior of the socket member. Fig. 2 is a view showing a longitudinal elevation of the chuck partially in section. Fig. 3 is a cross sectional view through the line A—B in Fig. 2.

Like letters and numerals of reference indicate corresponding parts in each figure.

Referring to the drawings, and particularly to Figs. 1, 2 and 3, $a$ is a socket member having the reduced outer end $b$ and the annular groove $c$ surrounding said reduced outer end $b$, in proximity to said outer end and in the inner wall of the internal recess thereof, the longitudinal journal slots $d$ arranged at intervals circumferentially.

$e$ are clutch members having the longitudinal journals $f$ corresponding to and inserted in the slots $d$ and of segmental form in cross section. The faces $g$ of said clutch members are eccentric in each instance to the journaling thereof and preferably have corrugated surfaces.

$h$ are pins extending from the outer end faces of the clutch members and preferably forming part therewith.

It will be thus seen that the clutch members $e$ turning in their slot bearings $d$ will swing towards the center of the socket member recess and close on a drill shank thrust centrally into said socket member $e$.

$i$ and $j$ are spiral springs inserted in the annular groove $c$ at opposite sides thereof respectively. The spring $i$ abutting at one end the fixed stop $k$ and the spring $j$ abutting at one end the fixed stop $l$, said stops being secured in the bed of said slot diametrically opposite one to the other.

$m$ and $n$ are blocks having threaded orifices $o$ and $p$ therein and slidably arranged in the annular groove $c$ adjacent to the other side of said stops $k$ and $l$, respectively, and abutting the other ends of said springs, so that any movement of said blocks in said slots $c$ will compress the springs against the fixed stops.

$q$ is a ring encircling the outer and reduced end $b$ of the socket $a$ and having orifices $r$ and $s$ therethrough diametrically opposite one to the other, $t$ is a face plate preferably forming part with said ring and having a central orifice $u$ and radial slots $v$ extending from said orifice. The ring $q$ is mounted on the reduced end $b$ of the socket member $a$, thus covering in the springs $i$ and $j$, blocks $m$ and $n$ and stops $k$ and $l$. $w$ are screws inserted through the orifices $r$ and $s$ and joining said ring to the blocks $m$ and $n$. The pins $h$ on the outer end faces of the clutch members $e$ enter the radial slots $v$ arranged in the inner side of the face plate $t$ when the said ring is in place, therefore any rotative movement of the said ring will turn the said clutch members in their journal bearings and as the said blocks move with any rotative movement of the said ring, being joined thereto, the spiral springs $j$ are compressed, which is the position they are in when the said clutch members are open to receive a drill shank, and as the said ring is permitted to return, the pressure of the springs keeps the said clutch members to their engagement with the shank of the drill in readiness for use.

In the operation of this device, the clutch members are normally in their closed position, that is approaching the center, and in order to insert a drill shank the rotatable ring is turned against the spring pull or pressure in the different forms of the invention, so that the clutch members spread or open in readiness to receive the drill shank. The drill shank is then shoved home, and the clutch members return and engage said shank, and as the drill is put into operation each turn of said drill tightens the clutch members on said shank, until it is firmly secured in place. In order to release the drill shank the ring is again turned and the drill dropped out.

The faces of the clutch members may be ridged and grooved, so that the ridges of one jaw will enter the grooves of the other for the purpose of holding small drills or the like. The periphery of the rings and the socket members respectively are preferably knurled, so that the same may be handled with a firm grip in releasing and inserting a drill. The forms of the clutch members and rings may be changed from time to time as may be most convenient, the salient features being the swinging clutch members spring-held and the ring governing said movement.

In Fig. 2, a small catch 34 is shown as a locking device in which the said catch is inserted in a correspondingly dove-tailed vertical groove 35 and slides upwardly to the upper end of the said groove. The point 36 of said latch engages the ring in the notch 37 when the said ring is turned to open to the extreme the clutch members, thus retaining said members in their open position while the workman is in the act of inserting a drill shank.

What I claim as my invention is:—

1. In a chuck, in combination, a cylindrical shaped socket member having journal slots longitudinally arranged in its inner wall, clutch members journaled in said slots and swinging towards the center, and a cover placed over the open end of said socket member and inclosing said clutch members and having a central opening, radial slots from said opening in its inner face and a flange from its outer edge extending over and encircling the periphery of said socket member, substantially as described.

2. In a chuck, the combination with a cylindrical casing having an open end and a cover plate on said open end having suitable grooves therein, of a plurality of clutch members having pin projections therefrom extending into said grooves and forming the means of swinging the gripping faces of said clutch members to and from the center, springs retaining said clutch members in their central position, and a ring encircling said cylindrical casing and by rotation thereon governing the position of said pin projections from the clutch members, substantially as described.

3. A chuck, comprising a cylindrical socket member having a reduced outer end and an annular groove in the periphery thereof and recessed from the under side, said recess having journal slots longitudinally arranged in the inner wall thereof, a plurality of clutch members segmental in cross section and having journals turning in said journal slots and arc-shaped faces eccentric to said journal bearings, pin projections from the outer end faces of said clutch members, a pair of spiral springs encircling said annular groove at diametrically opposite sides and suitably stopped in said groove, a ring encircling said reduced outer end and having projections extending into said groove, said projections engaging the ends of said springs, and a cover plate having a central orifice therethrough closing in said recess, rigid with said rotatable ring and engaging said pins from the clutch members, substantially as described.

4. In a device of the class described, in combination, a cylindrical socket member having a reduced outer end and a recess from the under side and longitudinally arranged journal slots in the walls of said recess and an annular groove encircling said reduced outer portion, a plurality of clutch members segmental in cross section and having journals rigid therewith turning in said journal slots and the faces thereof eccentric to the journaling, pins projecting from the outer ends, a pair of stops in said groove diametrically opposite one to the other, a pair of spiral springs in said groove engaging said stops respectively, a pair of blocks corresponding to and sliding in said annular groove having threaded orifices therethrough and engaging the other ends of said springs, a cover plate having a central orifice therethrough and radial slots extending from said central orifice registering with said pins, said cover plate having a ring extending inwardly therefrom over said reduced portion of said socket member and holes through said ring registering with the holes in said blocks, and screws joining said ring to said blocks, substantially as described.

Signed at the city of Coventry in the county of Warwick in the United Kingdom of Great Britain and Ireland this seventh day of December, 1906.

WILLIAM ARTHUR OUBRIDGE.

Witnesses:
JOHN RAVEN,
RANSHALL HAWTHORNE.